(12) United States Patent
Jaeger et al.

(10) Patent No.: US 11,685,204 B2
(45) Date of Patent: *Jun. 27, 2023

(54) HITCH FOR AN AGRICULTURAL VEHICLE

(71) Applicant: Swivel King, LLC, Keota, IA (US)

(72) Inventors: Luke Jaeger, Keota, IA (US); Kyle Moore, Fairfield, IA (US)

(73) Assignee: Swivel King, LLC, Keota, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/855,221

(22) Filed: Jun. 30, 2022

(65) Prior Publication Data

US 2022/0332156 A1    Oct. 20, 2022

Related U.S. Application Data

(63) Continuation of application No. 17/356,928, filed on Jun. 24, 2021, now Pat. No. 11,407,264.

(60) Provisional application No. 63/137,407, filed on Jan. 14, 2021.

(51) Int. Cl.
*B60D 1/48* (2006.01)
*B60D 1/01* (2006.01)
*A01B 59/042* (2006.01)

(52) U.S. Cl.
CPC .............. *B60D 1/48* (2013.01); *A01B 59/042* (2013.01); *B60D 1/01* (2013.01)

(58) Field of Classification Search
CPC ............ B60D 1/48; B60D 1/01; A01B 59/042
See application file for complete search history.

(56) References Cited

U.S. PATENT DOCUMENTS

| 4,045,143 | A | | 8/1977 | Gomiero | |
|---|---|---|---|---|---|
| 4,367,802 | A | | 1/1983 | Stiff et al. | |
| 5,355,971 | A | * | 10/1994 | Austin | B60K 25/06 |
| | | | | | 180/53.3 |
| 6,502,847 | B1 | | 1/2003 | Greaves | |
| 6,764,092 | B1 | | 7/2004 | Greaves, Jr. | |
| 9,840,277 | B1 | * | 12/2017 | Beech | B60D 1/62 |
| 11,407,264 | B2 | * | 8/2022 | Jaeger | B60D 1/145 |
| 2004/0212176 | A1 | * | 10/2004 | Colistro | B60D 1/075 |
| | | | | | 280/482 |
| 2021/0345535 | A1 | * | 11/2021 | Manica | B60D 1/167 |

FOREIGN PATENT DOCUMENTS

| CA | 2282371 A1 | * | 8/2000 | | A01B 71/04 |
|---|---|---|---|---|---|
| CA | 2282371 A1 | | 8/2000 | | |
| DE | 102011116827 A1 | * | 4/2013 | | A01C 23/045 |
| DE | 102011116827 A1 | | 4/2013 | | |
| WO | 9640531 A1 | | 12/1996 | | |

OTHER PUBLICATIONS

Canadian Office Action dated Mar. 22, 2023 from counterpart Canadian App. No. 3,145,131.

* cited by examiner

*Primary Examiner* — Jacob D Knutson
(74) *Attorney, Agent, or Firm* — Shuttleworth & Ingersoll, PLC; Jason Sytsma

(57) ABSTRACT

A first assembly combinable to the heavy equipment and a second assembly pivotally attached to the first assembly for rotation about a first axis and configured for pivotal attachment to the vehicle for rotation about a second axis. A tow rod extending from the first assembly with a third axis extending therethrough and combinable to the heavy equipment and configured for rotation with respect to the heavy equipment about the third axis.

13 Claims, 3 Drawing Sheets

HITCH FOR AN AGRICULTURAL VEHICLE

CROSS-REFERENCE TO RELATED APPLICATIONS

The present application claims the benefit of U.S. Provisional Patent Application No. 63/137,407 filed on Jan. 14, 2021 and U.S. patent application Ser. No. 17/356,928 filed Jun. 24, 2021. The contents of which are hereby incorporated by reference herein.

TECHNICAL FIELD

This disclosure is directed to a hitch for an agricultural vehicle, and more specifically, this disclosure is directed to a dual axis hitch for hauling heavy equipment.

BACKGROUND INFORMATION

When using farm machinery to work a farm, it is necessary to tow heavy equipment across rough and uneven terrain, such as manure tanks, manure spreaders, wagons, and the like. A problem with towing such heavy equipment is the load on the hitch between the tractor and the farm implement, especially on uneven terrain.

Various hitches have been proposed to provide slack in the hitch to allow the tow bar to move up and down and side to side to accommodate the jostling of the farm implement. However, these hitches have not been fully successful in solving the various problems that are associated with towing relatively heavy implements. These hitches are prone to snapping under the heavy loads.

Accordingly, there is a need for an improved hitch.

SUMMARY

Disclosed is a hitch for towing heavy equipment with a vehicle. The hitch comprises of a first assembly combinable to the heavy equipment and a second assembly pivotally attached to the first assembly for rotation about a first axis and configured for pivotal attachment to the vehicle for rotation about a second axis.

In one implementation, the first axis is horizontal to a ground plane and the second axis is vertical with respect to the ground plane. This can mean that the first axis is perpendicular to the second axis. In such implementations, the second assembly can rotate one-hundred and eighty degrees about the first axis with respect to the first assembly and the second assembly is rotatable one-hundred and eighty degrees about the second axis with respect to the vehicle.

In another implementation, the first assembly comprises of a tow rod with a third axis extending therethrough. The tow rod is combinable to the heavy equipment and configured for rotation with respect to the heavy equipment about the third axis. In such implementations, the hitch has a third axis of rotation that is coaxial with a tow rod that is connected to the heavy equipment. Such an arrangement provides a hitch with three axes of rotation to provide improved safety for the heavy equipment and the vehicle while extending the useful life of the hitch.

In an embodiment, a steering assembly is provided to attach a steering rod to the hitch. The steering assembly can be combined to the first assembly or the second assembly and combinable to a steering rod that extends to a steering valve in the heavy equipment. The steering assembly can comprise a top bracket comprising a slot oriented along a direction of the first axis in the top bracket. Positioning the attachment of the steering rod on the slot of the bracket can adjust the sensitivity of the steering valve of the heavy equipment. In this regard, the farther out on the slot from a center of the top bracket the steering rod is positioned the faster the steering will react. The closer in on the slot from the center of the top bracket the steering rod is positioned the slower the steering will react.

In an embodiment, the steering assembly can also have a length adjustment combined to the steering rod to adjust the length of the steering rod. This allows for proper alignment of the wheels of the heavy equipment.

BRIEF DESCRIPTION OF THE DRAWINGS

These and other features and advantages of the present invention will be better understood by reading the following detailed description, taken together with the drawings wherein.

DETAILED DESCRIPTION

Figure 1:
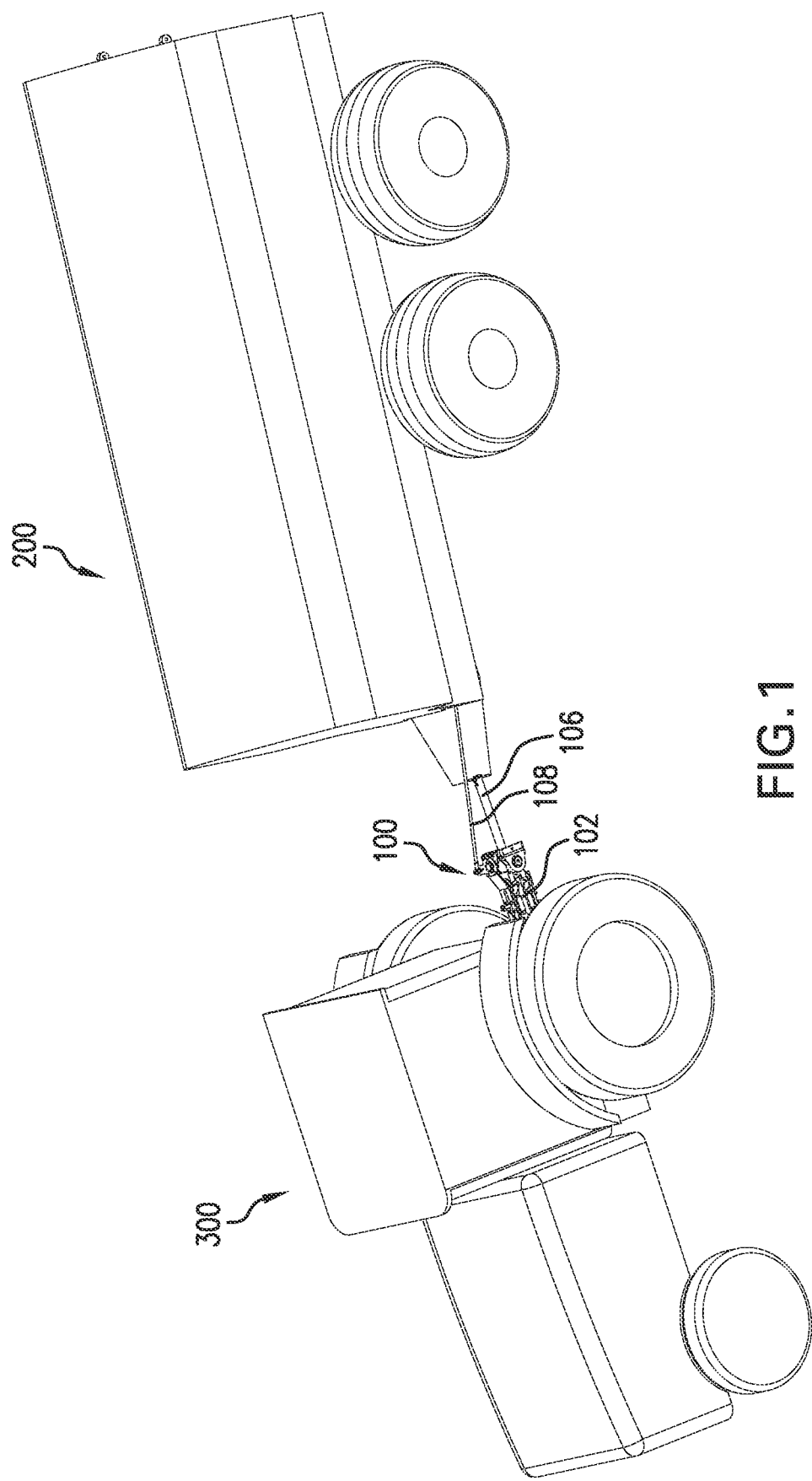
FIG. 1 is a perspective view of a hitch connecting a farm vehicle to a manure tank according to this disclosure.
Figure 2:
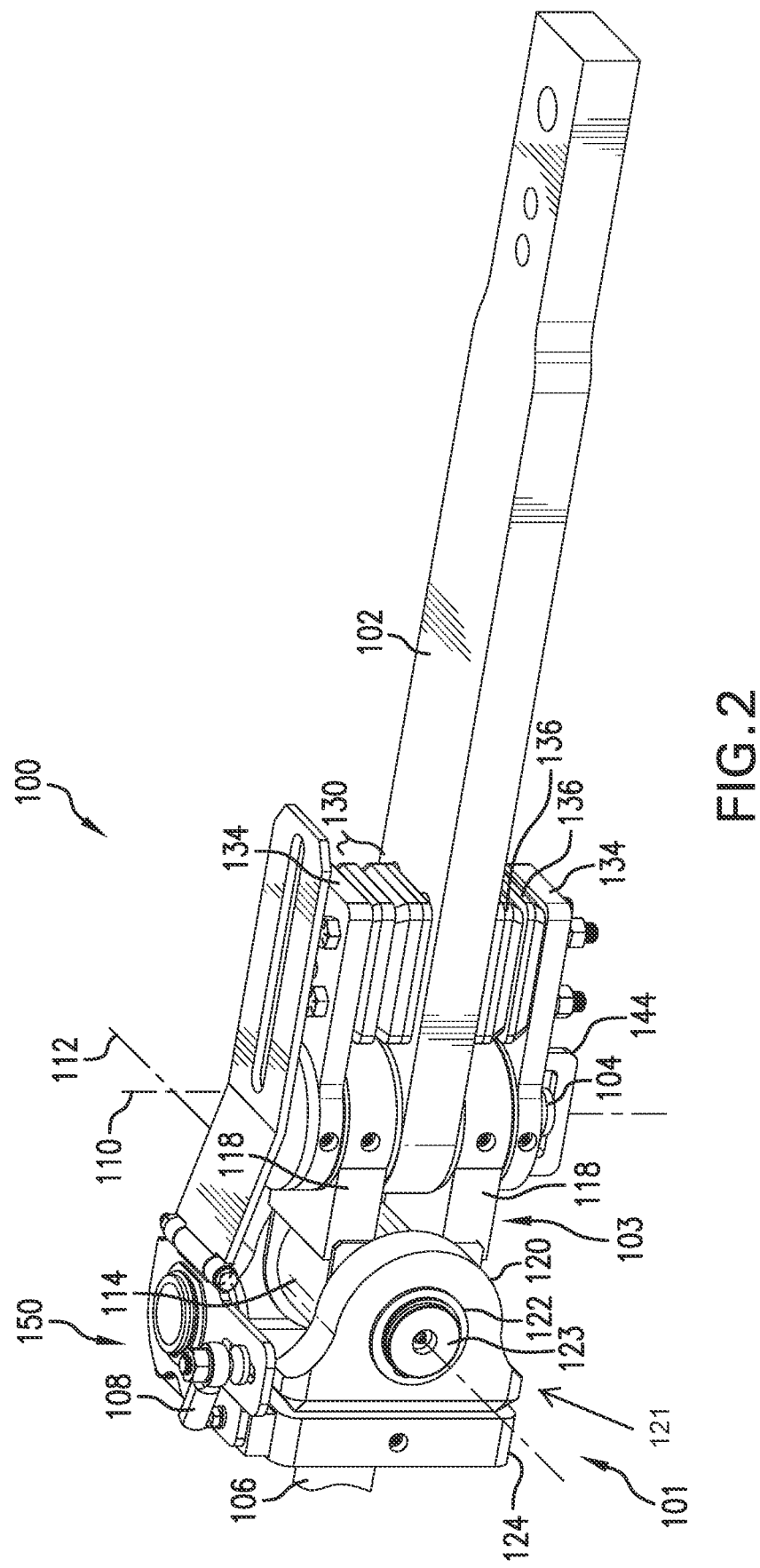
FIG. 2 is a close-up perspective view of the hitch of FIG. 1.
Figure 3:
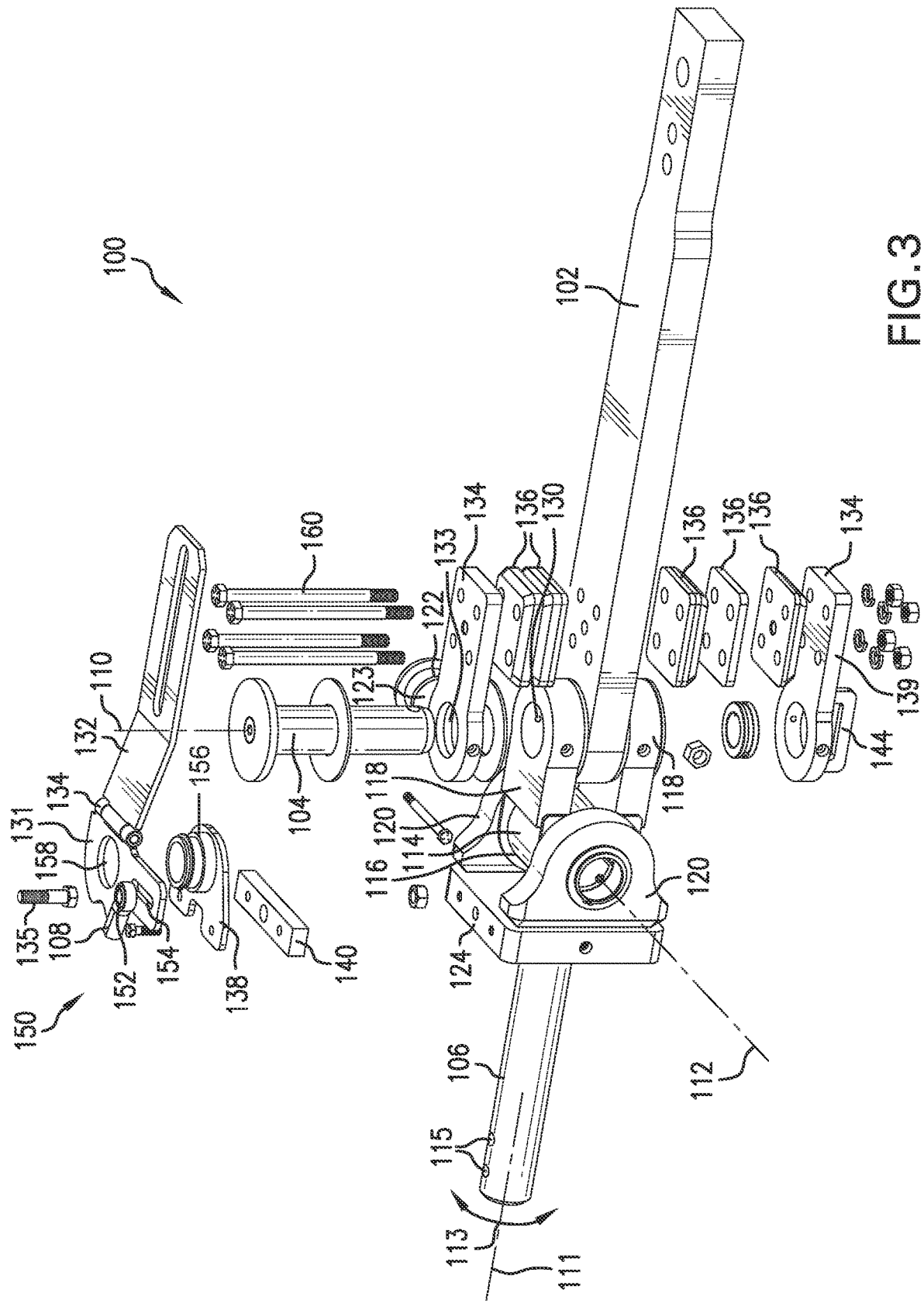
FIG. 3 is an exploded view of the hitch of FIG. 1.

Disclosed is a hitch 100 for towing heavy equipment. While hitch 100 can be used for towing any type of heavy equipment, hitch 100, as shown and described herein, is particularly useful for towing a manure tank 200 with a farm vehicle 300. With reference to FIGS. 1-3, shown is hitch 100 for towing manure tank 200 with farm vehicle 300 according to this disclosure. In this particular implementation, hitch 100 is designed to connect at one end to a tow bar 102 that extends to farm vehicle 300. At the other end, hitch 100 is connected to a tow rod 106 that is connected to manure tank 200. Hitch 100 is particularly advantageous for towing manure tank 200 over rough terrain because it has three axes of rotation, as shown in FIG. 3, a first axis 112, a second axis 110, and a third axis 111. This allows manure tank 200 to jostle around in three dimensions of movement without breaking hitch 100. It should be noted, that hitch 100 can be attached to manure tank 200 without third axis 111 and still provided improved maneuverability over rough terrain.

Hitch 100 comprises of a first assembly 101 pivotally attached to a second assembly 103. Second assembly 103 is combinable to the heavy equipment, in the illustrated case farm vehicle 300, via connection to tow bar 102 by hitch pin 104. This allows second assembly 103 to pivot horizontally, side-to-side on second axis 110 extending through hitch pin 104. First assembly 101 is pivotally attached to second assembly 103 to allow vertical up-and-down movement about a first axis 112. First assembly 101 can be fixed to a tow rod 106 that is attachable to manure tank 200 in a manner that allows axial rotation about third axis 111 or attached in a manner without axial rotation about third axis 111.

More specifically, first assembly 101 comprises of a bearing assembly 121. Bearing assembly 121 can comprise of a pair of spaced-apart bearings 120 (illustrated as pillow-top bearings) combined to a plate 124. Plate 124 has press-fitted therein a shouldered tow rod 106 that extends from plate 124 and is attachable at its other end to manure tank 200. Tow rod 106 comprises of a shoulder of a diameter larger than a hole in the back of plate 124 from which tow rod 106 extends to prevent tow rod 106 from separating from first assembly 101. This is an added safety feature that prevents manure tank 200 from breaking free from hitch 100.

Tow rod 106 attaches at its other end to manure tank 200. Tow rod 106 has at least one hole 115 machined in its outer end with a collar slideable thereon. Tow rod 106 is positioned into a receiving hole on manure tank 200, as shown in FIG. 1. Because tow rod 106 is fixed to hitch 100 and rotatably attached to manure tank 200, hitch 100 rotates with respect to manure tank 200 about third axis 111 that extends co-axially with tow rod 106 in the directions of directional arrows 113.

Second assembly 103 comprises of a clevis housing 114 that is combined to first assembly 101 for rotation of clevis housing 114 with respect to first assembly 101 about first axis 112. Clevis housing 114 can comprise of a pair of spaced-apart projecting members 118 with a hole 130 extending there-through. Tow bar 102, which is attached to farm vehicle 300 at its far end, is positioned between projecting members 118 and attached thereto by a hitch pin 104. This allows tow bar 102 to rotate with respect to clevis housing 114 about second axis 110 coaxial with hitch pin 104.

Bushings 122 are positioned coaxially in the holes of bearings 120 of first assembly 101. These bushings 122 can be standard bushings or tension spring bushings, which are easily replaceable from wear. Clevis housing 114 comprises of a tube 116 that is positioned between bearings 120 of first assembly 101 and combined together by a pin 123. Pin 123 can be provided with a through hole and a series of branched holes formed around the circumference of pin 123 in communication with the through hole. A grease insert can be inserted into the through hole to provide easy lubrication of the area of rotation between tube 116 of clevis housing 114 and pin 123.

First axis 112 is coaxial with pin 123. This arrangement allows second assembly 103 to pivot with respect to first assembly 101 about first axis 112.

Continuing with second assembly 103, tow bar 102 is further secured to second assembly by at least one reinforcement member 134. In the illustrated embodiment, a reinforcement member 134 is positioned on the top and bottom side of tow bar 102. Reinforcement member 134 comprises a hole 133 that is coaxial with hole 130 of clevis housing 114 and an extending portion 139 that extends along tow bar 102. At least one bushing 136 is positioned between extending portion 139 of reinforcement member 134 and tow bar 102 and combined thereto by at least one fastener 160. On the bottom reinforcement member 134, a hitch pin latch 144 is provided. Hitch pin latch 144 is a u-shaped bracket that is combined to reinforcement member 134 and extends across hole 133 in reinforcement member 134 to prevent hitch pin 104 from falling out of hitch 100. This is another safety feature that keeps hitch pin 104 in place and prevents it from falling out of hitch 100, which could cause manure tank 200 to separate from farm vehicle 300.

Disclosed herein is a hitch 100 that has two to three axes of rotation, a first axis 112, a second axis 110, and an optional third axis 111. In this arrangement, first axis 112 can be positioned relatively horizontal to a ground plane and second axis 110 can be positioned relatively vertical with respect to the ground plane. First axis 112 can also be perpendicular to second axis 110. As illustrated, first assembly 101 can pivot with respect to second assembly 103 one-hundred an eighty degrees about first axis 112. Similarly, second assembly 103 can pivot with respect to tow bar 102 one-hundred eighty degrees about second axis 110. In practice however, less freedom of movement is required. In this regard, the respective degrees of movement can be 1 degree to 180 degrees (or any degree in between).

When hitch 100 is configured with tow rod 106 and attached to manure tank 200, for example, a third degree of rotation can provided, as discussed above. Third axis 111 extends coaxial with tow rod 106 and rotates with respect to manure tank 200 in the direction of directional arrows 113. In this regard, third axis 111 can be perpendicular to first axis 112 or second axis 110. Similarly, third axis 111 can rotate with respect to manure tank 200 three-hundred and sixty degrees. In practice however, less freedom of rotation is required. In this regard, the respective degrees of rotation can be 0 degrees to 15 degrees (or any degree in between) in either direction to allow for the tractor and the implement to maneuver over uneven terrain without breaking hitch 100.

It can be necessary to attach a steering rod 108 from the heavy equipment; for example, from manure tank 200, to hitch 100. In such instances, a steering assembly 150 is provided on hitch 100. Steering assembly 150 can be connected to either first assembly 101 or second assembly 103. In the illustrated embodiment, steering assembly 150 is attached to first assembly 101 of hitch 100. Steering rod 108 extends from the steering valve on manure tank 200 to an attachment point 152.

Steering assembly 150 comprises of a top bracket 131 comprising a slot 154 oriented along a direction of first axis 112 in top bracket 131. The positioning of the attachment point 152 for steering rod 108 in slot 154 determines the sensitivity of the steering valve in manure tank 200. The farther out on slot 154 from a center of top bracket 131 steering rod 108 is positioned the faster the steering will react and the closer in on slot 154 from the center of top bracket 131 steering rod 108 is positioned the slower the steering will react.

Steering assembly 150 can further comprise of a bottom bracket 138 fixed to first assembly 101. As illustrated, bottom bracket 138 is attached to plate 124 with an optional spacer 140 in between by fasteners 135. A collar 156 is attached to bottom bracket 138 with a top portion that extends through a hole 158 in top bracket 131 and locked in place by a retaining ring 137. This arrangement allows bottom bracket 138 to rotate with respect to top bracket 131. Top bracket 131 is therefore maintained parallel with tow bar 102 and pivots up and down as first assembly 101 moves up and down.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A hitch for towing heavy equipment with a vehicle, the hitch comprising:
a first assembly combinable to the heavy equipment;
a second assembly pivotally attached to the first assembly for rotation about a first axis and configured for pivotal attachment to the vehicle for rotation about a second axis, wherein the first axis is perpendicular to the second axis, and wherein the first axis is horizontal to a ground plane and the second axis is vertical with respect to the ground plane, and wherein the first assembly is combinable to a tow rod with a third axis extending therethrough, which tow rod is combinable to the heavy equipment and configured for rotation with respect to the heavy equipment about the third axis.

2. The hitch of claim 1, wherein the second assembly is rotatable about the first axis with respect to the first assembly and the second assembly is rotatable about the second axis with respect to the vehicle.

3. The hitch of claim 1, wherein the third axis is perpendicular to the first axis and to the second axis.

4. The hitch of claim 1, wherein the first assembly comprises of a bearing assembly and the second assembly comprises of a clevis housing, wherein the clevis housing is combined to the bearing assembly by a pin, wherein the first axis is defined by the rotation of the clevis housing with respect to the bearing assembly.

5. The hitch of claim 1, and further comprising a steering assembly combined to the first assembly or the second assembly and combinable to a steering rod that extends to a steering valve in the heavy equipment.

6. The hitch of claim 5, wherein the steering assembly comprises of a top bracket comprising a slot oriented along a direction of the first axis in the top bracket, wherein positioning an attachment of the steering rod on the slot of the bracket adjusts a sensitivity of the steering valve of the heavy equipment such that farther out on the slot from a center of the top bracket the steering rod is positioned the faster the steering will react and closer in on the slot from the center of the top bracket the steering rod is positioned the slower the steering will react.

7. The hitch of claim 6, and further comprising a length adjustment combined to the steering rod to adjust a length of the steering rod.

8. The hitch of claim 7, wherein the steering assembly is combined to the first assembly, wherein the steering assembly further comprises of a bottom bracket fixed to the first assembly and the top bracket rotatably attached to the bottom bracket.

9. The hitch of claim 1, wherein the heavy equipment is a manure tank and the vehicle is a farm vehicle.

10. The hitch of claim 1, wherein the first axis is a horizontal axis and the second axis is a perpendicular axis, wherein the second assembly is rotatable about the horizontal axis with respect to the first assembly and the second assembly is rotatable about the second axis with respect to the vehicle; wherein the hitch further comprises of a steering assembly combined to the first assembly or the second assembly and combinable to a steering rod that extends to a steering valve in the heavy equipment.

11. A hitch for towing heavy equipment with a vehicle, the hitch comprising:
 a first assembly combinable to the heavy equipment;
 a second assembly pivotally attached to the first assembly for rotation about a first axis and configured for pivotal attachment to the vehicle for rotation about a second axis, wherein the second assembly comprises of a clevis housing that is combined to the first assembly for rotation of the clevis housing with respect to the first assembly about the first axis, and wherein the clevis housing further comprises of a pair of spaced-apart projecting members with a hole extending therethrough and configured to receive a tow bar that is attached at its other end to the vehicle, and wherein the hole is configured to receive a hitch pin to attach the tow bar to the clevis housing of the second assembly, and wherein the tow bar rotates with respect to the clevis housing about the second axis extending through the hitch pin.

12. The hitch of claim 11, and further comprising a reinforcement member comprising a hole that is coaxial with the hole of the clevis housing and an extending portion that extends along the tow bar; and at least one busing positioned between the extending portion of the reinforcement member and the tow bar and combined thereto by a fastener.

13. The hitch of claim 12, and further comprising a hitch pin latch combined to the reinforcement member and extending across the hole in the reinforcement member to prevent the hitch pin from falling out of the hole extending through the spaced-apart projecting members.

\* \* \* \* \*